July 28, 1931.  O. F. ROHWEDDER  1,816,400

SLICED BREAD PACKAGE

Filed Nov. 14, 1928

*INVENTOR*

Patented July 28, 1931

1,816,400

UNITED STATES PATENT OFFICE

OTTO F. ROHWEDDER, OF DAVENPORT, IOWA, ASSIGNOR TO MAC-ROH SALES & MFG. COMPANY, OF DAVENPORT, IOWA, A CORPORATION OF DELAWARE

SLICED BREAD PACKAGE

Application filed November 14, 1928. Serial No. 319,237.

My improvement relates to means for retaining the slices of a sliced loaf of bread in the same relative position occupied by them before they were sliced.

The objects of my invention are to provide a support for a sliced loaf of bread in combination with adjustable means for holding the slices in their original position while upon such support.

I attain these objects by the means illustrated in the accompanying drawings, in which,—

Figure 1:
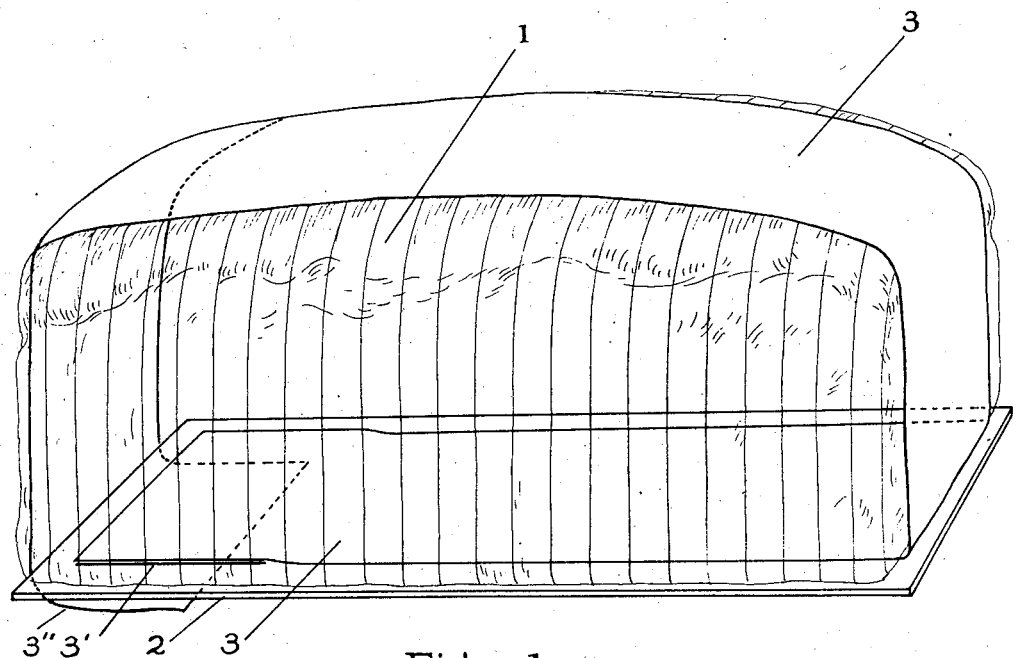
Figure 1 is a perspective view of my improvement applied to a sliced loaf of bread.

My device comprises a base or support, 2, for a sliced loaf of bread, 1, and this base is preferably composed of fairly stiff pasteboard or strawboard, but thin strips of wood or other supporting means may be used when desired. A retaining strip or band, 3, is pasted or otherwise suitably secured to the left end of the support, 2, and is preferably composed of waxed paper. In the drawings I have shown this strip, 3, as somewhat narrower than the loaf of bread, but it may be formed of the same width as the loaf of bread if desired and when so formed, will be a little more efficient to prevent drying-out than the narrower strip.

In applying my device to a sliced loaf of bread, the retaining strip, 3, is first pasted to the support, 2, at the lefthand end as shown at 3', and is laid out lengthwise on the support, 2.

Figure 2:
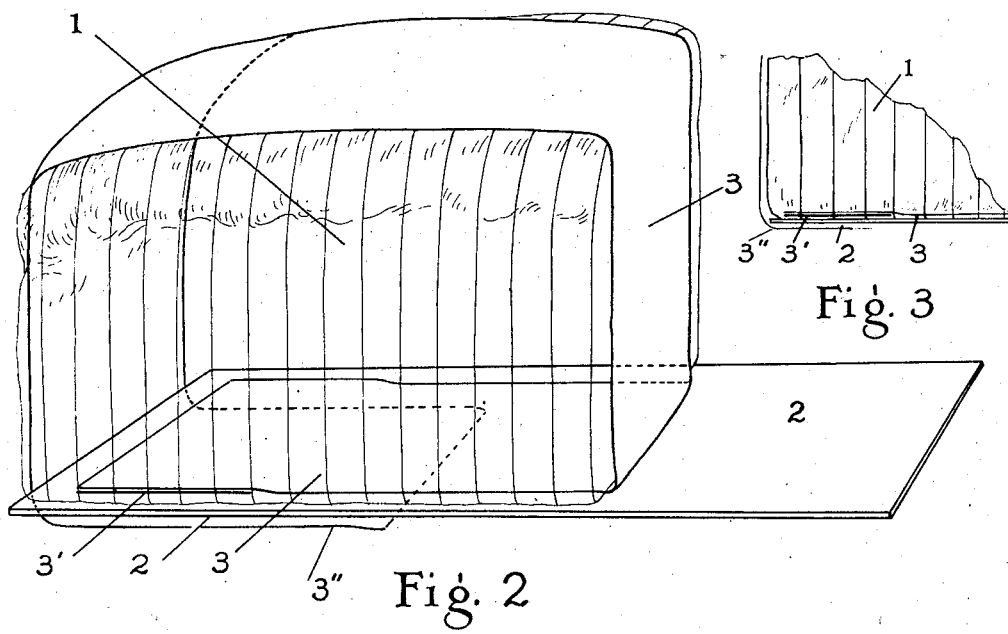
Figure 2 is a perspective view of my improvement applied to the remaining portion of a sliced loaf of bread after a part thereof has been removed.
Figure 3:
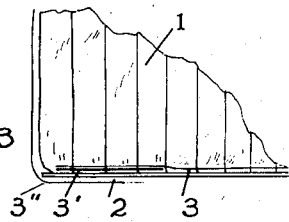
Figure 3 is a detail elevation of the left end of Figure 1 showing the method of securing the paper retaining band to the base.

The sliced loaf of bread is then placed upon the support, 2, and the portion of the retaining strip, 3, lying thereon and the free end of the retaining strip is then raised and the retaining strip, 3, drawn along and over the loaf of bread, as shown in Figure 1, and the free end, 3'', of the retaining strip, 3, may be secured under the end of the loaf and support, 2, as shown in Figures 1 and 2.

In cases where a portion of the sliced loaf has been removed, the retaining strip, 3, may be drawn up and over the remainder of the loaf as shown in Figure 2, and in case any shrinkage occurs from drying-out, the slack may be taken up by tightening the strip, 3, and when so tightened, the weight of the loaf resting upon the free end, 3'', will hold the slices closely together. It is obvious that the support, 2, and the strip, 3, may be applied to the sliced loaf of bread before it is wrapped, and when so applied, will act to stiffen the loaf and prevent dislodgement of any of the slices during such handling of the wrapped loaves as takes place in loading and unloading the bread from bread wagons and otherwise handling it in the usual course of trade.

It is obvious that the shape and proportions of the support, 2, and of the retaining strip, 3, may be varied to a considerable extent without departing from the spirit of my invention and additional retaining means may be added if desired.

I claim:

A bread loaf package comprising, in combination, a supporting tray consisting of a support and a flexible strip secured at one end to the upper surface of said support, and a baked loaf of bread divided into a plurality of uniform slices, said sliced loaf being positioned on said strip and support, said strip being extended over the top and ends of said sliced loaf and secured to the lower surface of said support at the same end to which the first mentioned end of said strip is secured to thereby hold said slices in contiguous presliced form while said loaf is being and after it is wrapped.

In testimony whereof he affixes his signature.

OTTO F. ROHWEDDER.